United States Patent [19]

Ferre et al.

[11] Patent Number: 4,880,026

[45] Date of Patent: Nov. 14, 1989

[54] INTEGRATED FREE-STANDING VEHICLE DETAILING SERVICE CENTER

[75] Inventors: F. Budd Ferre; Rowell Sims; Wesley G. Bowen; Vibert L. Kesler, all of Salt Lake City, Utah

[73] Assignee: Parapluie, Ltd., Baar, Switzerland

[21] Appl. No.: 226,269

[22] Filed: Jul. 28, 1988

[51] Int. Cl.$^4$ ............................................. B60S 3/00
[52] U.S. Cl. ................................. 137/234.6; 134/123; 15/DIG. 2; 52/79.1; 52/79.5
[58] Field of Search ...................... 137/234.6; 52/79.1, 52/79.5, 79.12; 134/123; 15/DIG. 2

[56] References Cited

U.S. PATENT DOCUMENTS

| | | | |
|---|---|---|---|
| 2,021,544 | 11/1935 | Crown | 137/234.6 X |
| 3,536,109 | 10/1970 | Ginsburgh | 137/234.6 X |
| 3,621,869 | 11/1971 | Albarran | 137/234.6 |
| 3,624,852 | 12/1971 | Hanna | 15/DIG. 2 X |
| 3,772,723 | 11/1973 | Krimm | 15/DIG. 2 X |
| 3,832,811 | 9/1974 | Briel, Jr. | 52/79.5 X |
| 4,284,173 | 8/1981 | Patterson | 137/234.6 X |
| 4,594,817 | 6/1986 | McLaren et. al. | 52/79.12 X |
| 4,637,179 | 1/1987 | Bigelow, Jr. et al. | 52/79.5 |
| 4,726,157 | 2/1988 | Holt et al. | 52/79.5 |
| 4,732,186 | 3/1988 | Nishikawa | 134/123 |

FOREIGN PATENT DOCUMENTS 0104442  6/1982  Japan .................................. 137/234.6

OTHER PUBLICATIONS

Poling, James, "New Clinic Gives Cars Family–Doctor Care", Popular Science, vol. 156, No. 5 (May 1950), pp. 140–143.

Primary Examiner—John Rivell
Attorney, Agent, or Firm—Lynn G. Foster

[57] ABSTRACT

A transportable, integrated work site designed specifically to facilitate the convenient and complete detailing of motorized vehicles; comprising a rigid skeletal structure which is constructed of preformed, connectable modules and defines a specific work bay or site, three cabinets situated about the periphery of the bay used to store and display auto detailing equipment and products, a series of variable intensity lights and spotlights disposed at various locations about the site having the capability of completely eliminating shadows when illuminating a vehicle, a rotatable mat drying rack, self-contained electrical, plumbing and vacuum systems, and a variety of specialized auto detailing equipment such as fans and an air compressor attached to the skeletal structure or stored within the cabinets. The work site is readily disassembled and transported to more favorable locations. Disassembly is facilitated by the fact that the work site is not in any way anchored to the floor or ground upon which it rests. The work site's electrical and plumbing systems require only connection to conventional inlet and outlet sources for operation.

47 Claims, 9 Drawing Sheets

INTEGRATED FREE-STANDING VEHICLE DETAILING SERVICE CENTER

FIELD OF INVENTION

The present invention relates generally to automobile detailing and more particularly to a novel self-contained, readily transportable free-standing work bay or service center where a plurality of detailing and other functions occur in an efficient and well organized way.

PRIOR ART

Work areas used to effectuate auto detailing are known. Prior art site facilities, however, are most frequently converted parking bays or spaces previously utilized as general car repair stalls within existing buildings and thus lack certain useful features uniquely desirable in detail or related work. Auto detailing is best achieved by use of high illumination lighting emanating from a plurality of sources. Rarely, if ever, have prior art detailing sites been equipped with such high illuminating capabilities. Prior art stalls of the type in question lack support structure sufficient for storage and facile access to each specific piece of detailing equipment, such as fans, high intensity lighting, pumps and vacuums. Also, prior art work areas are not free-standing, but rather are generally permanently fixed in position by being anchored to the ground or floor, requiring initial governmental approval and on-going supervision and long term and expensive initial construction and producing a nontransportable service bay. Further deficiencies of the prior art are lack of ample storage space, absence of suitable display facilities for auto servicing products, limitation in modes of use, poor organization of and access to equipment used for detailing and like tasks and the requirement, especially in earthquake prone regions, of a permanent floor drainage system.

BRIEF SUMMARY AND OBJECTS OF THE INVENTION

In brief summary, the present invention overcomes or substantially alleviates the mentioned prior art problems and provides a novel, portable, integrated service center which facilitates detailing and similar servicing of automobiles and other vehicles. The presently preferred service center comprises a free-standing structure formed of a plurality of interconnected frame members with unanchored self-sustaining ground or floor engaging structure, the frame members being preferably arranged into an open framework or assembly so as to collectively form an effectual tunnel or bay, although closed frameworks are within the purview of the invention. An array of selectively operable high technology complementary sources of full spectrum bright illuminosity are carried by the framework. Display cabinets are conveniently disposed, such as at the head and/or either side of the work service center for storage and facile access. Both ends of the tunnel array of frames may be open where a drive-through format is desired. Two or more service centers may be in the same vicinity, such as side-by-side where one set of detailing and/or service equipment may be placed at a common interface, between the two service centers for joint use. Vacuums, drying and/or optimum temperature control fans, pumps, racks, compressor, buffers and other surface treatment machines and other specialized equipment are carried by the cabinetry or framework for convenient selective access and use. Self-contained plumbing and electrical systems for the service center are provided and may be readily integrated with any commercial or household source of electrical power and water, as well as waste water filtering and drainage as and where required.

A distinct advantage of the present invention over the prior art is its free-standing nature. It is also highly transportable, having the capability of being assembled and disassembled with relative ease and transported from place to place as needed or desired. The service center may be assembled indoors or out without structural permanency.

In its presently preferred form, the vehicle to be detailed or otherwise serviced is driven into and parked in the free-standing service center tunnel. The light sources are directed upon the vehicle and one or more of the complementary light sources is selectively illuminated for optimum results depending upon the task at hand. For example, during detailing and surface treatment of the vehicle full illumination is attained to brightly illuminate the entire surface of the vehicle across the entire spectrum whereby all shadows that would otherwise be present due to the unique curvature of the body of the vehicle are eliminated and the exact color of the vehicle is readily apparent to the service center operator. Detailing work is then commenced using the easily accessed juxtaposed and well arranged and functionally organized service equipment and supplies, carried by the framework or cabinetry of the service center. The service center is preferably equipped with a built-in stereo sound system for the benefit of the workers, which precludes use by the workers of the radio, cassette and sound system of the vehicle being serviced. Upon completion of the vehicle servicing, the vehicle is removed from the service center and service center is available for the next vehicle.

With the foregoing in mind, it is a primary object of the present invention to provide an integrated work station or service center for the detailing or other servicing of vehicles.

Another significant object is to provide a free-standing readily transportable and easily assembled and disassembled service center without structural permanency for the detailing or other servicing of vehicles.

A further significant object is to provide a service center for vehicles which can be quickly placed in use and comprises a plurality of variously located complementary light sources capable of selective actuation whereby the surface of a vehicle may be brightly illuminated for the task at hand including the eliminating of shadows and illuminating surface flaws, scratches and imperfections so that they may be dealt with during detailing and surface treatment. Thus, the reflection of the exact color or colors of the vehicle.

A further important object is the provision of an integrated service center for vehicles in which an open framework of interconnected frame members form a tunnel traversing both sides and the top of the vehicle, the framework carrying essentially all service equipment needed which may include but is not limited to self-contained lighting, ventilation, electrical, water, plumbing, air control, buffing and other surface treatment, waste water filtration, drainage, temperature control, vacuuming, shampooing, stereo sound and other important features.

It is a further paramount object to provide a novel integrated vehicle service center for detailing and other purposes having one or more of the following features and advantages: self-contained, efficient, convenient, flexible well organized, efficiently functional, displaying vehicle products, facile provision and access to service equipment and products, free-standing, efficient in use, adaptable for a variety of configurations and which can be placed in service in a matter of hours without permanent constructional changes to buildings and with minimal long delays in availability.

These and other objects and features of the present invention will be apparent from the detailed description taken with reference to the accompanying drawings.

DETAILED DESCRIPTION OF THE ILLUSTRATED EMBODIMENT

Reference is now made to the drawings, wherein like numerals are used to designate like parts throughout. A presently preferred free standing integrated vehicle detailing work unit or service center, generally designated 30 and implementing the principles of the present invention, is best illustrated by FIGS. 1-4. Any number of service centers 30 may be used in any desired arrangement at a given location. Work unit 30 comprises an open framework 31 illustrated as comprising a plurality of inverted U-shaped structural frames 32, 34, 36, 38 and 40 and aligned so as to collectively form a nonenclosed tunnel or bay 42 into which a vehicle may be driven. If desired the framework may be totally or partially covered. Preferably vacuum tube lines, compressor lines, electrical wiring and the like are routed through the components of the framework 31. Two longitudinal braces 44 and 46, run the length of the bay 42, along its crest 48, and rigidly connect the members 32, 34, 36, 38 and 40 together along the two elevated corner sites 82. Four cross-braces or intermediate beams, designated 50, 52, 54 and 56, run parallel with but offset from the structural frames 32, 34, 36, 38 and 40 and rigidly connect at each end to the respective longitudinal braces 44 and 46. Three display and storage cabinets 58, 60 and 62 are illustrated as being located respectively at one end and at each side of the bay 42. However, both ends of the service center may be open and the cabinets located along and/or parallel to the sides of the framework where a drive-through approach is desired. Also, cabinet 58 can be wheel or track mounted for transverse displacement out of alignment with the framework when a vehicle is finished and a drive through approach is desired. An array of light sources 64 are mounted on the framework 31. Other machinery, implements and products useful, if not essential, in detailing and/or servicing vehicles, hereinafter described in greater detail, are also stored, displayed and/or supported on, in or about the bay 42 in a well organized fashion for facile access and use.

Figure 5:
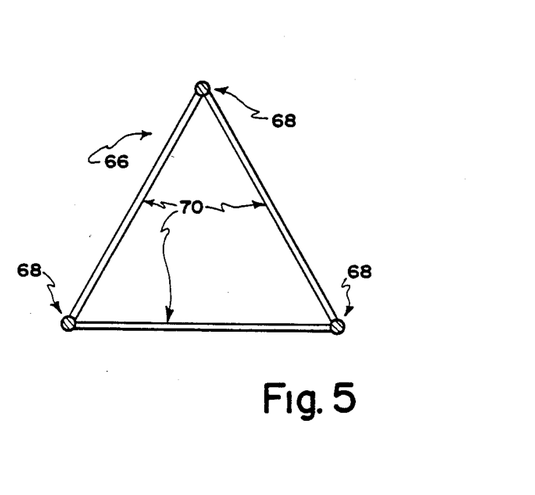
FIG. 5 is an enlarged cross-sectional view of the module comprising structural components of the auto service center of FIG. 1.
Figure 6:
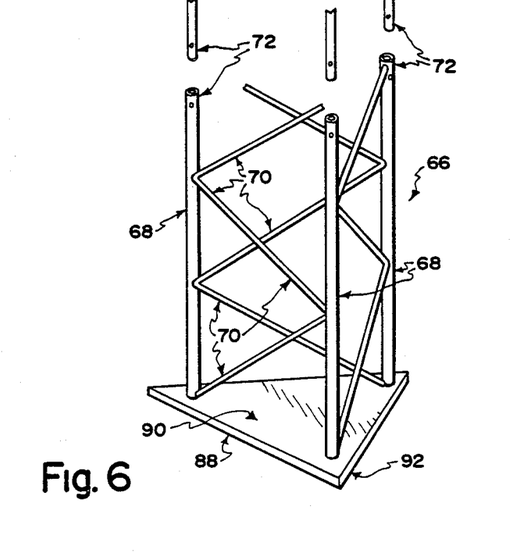
FIG. 6 is a perspective illustration of the module of FIG. 5 shown attached to a free-standing base plate which supports the service center of FIG. 1 against the floor or ground upon which it rests.

It is presently preferred that all components of the framework 31 forming the service center 42, except the cabinets 58, 60 and 62, comprise members selected from the Structura Space Frame System. Structura is the registered trademark of Targetti Sankey, S.p.A. Florence, Italy and the Structura frame members are distributed by Lightolier, Inc., headquartered in Secaucus, New Jersey. The Structura Space Frame System is a network of modular, three dimensional steel frames that can be arranged in any of a multitude of configurations to define space and that can carry a variety of loads. The basic Structura module 66 is presently preferred for framework 31 and has an equilateral triangular cross-section, as best shown in FIGS. 5 and 6. Structura module 66 comprises three relatively long 9/16 inch diameter rods 68 running parallel to each other that form the corners of the triangular cross-section, and a plurality of 5/32 inch diameter W-shaped stringers 70 rigidly connecting the rods 68 together at spaced intervals and forming the sides of the triangular cross-section. The rods 68 are each about $9\frac{7}{8}$ inches apart. While the Structura System is preferred at this time, other structural support systems and materials may be substituted without changing the scope or nature of the present invention.

Figure 1:
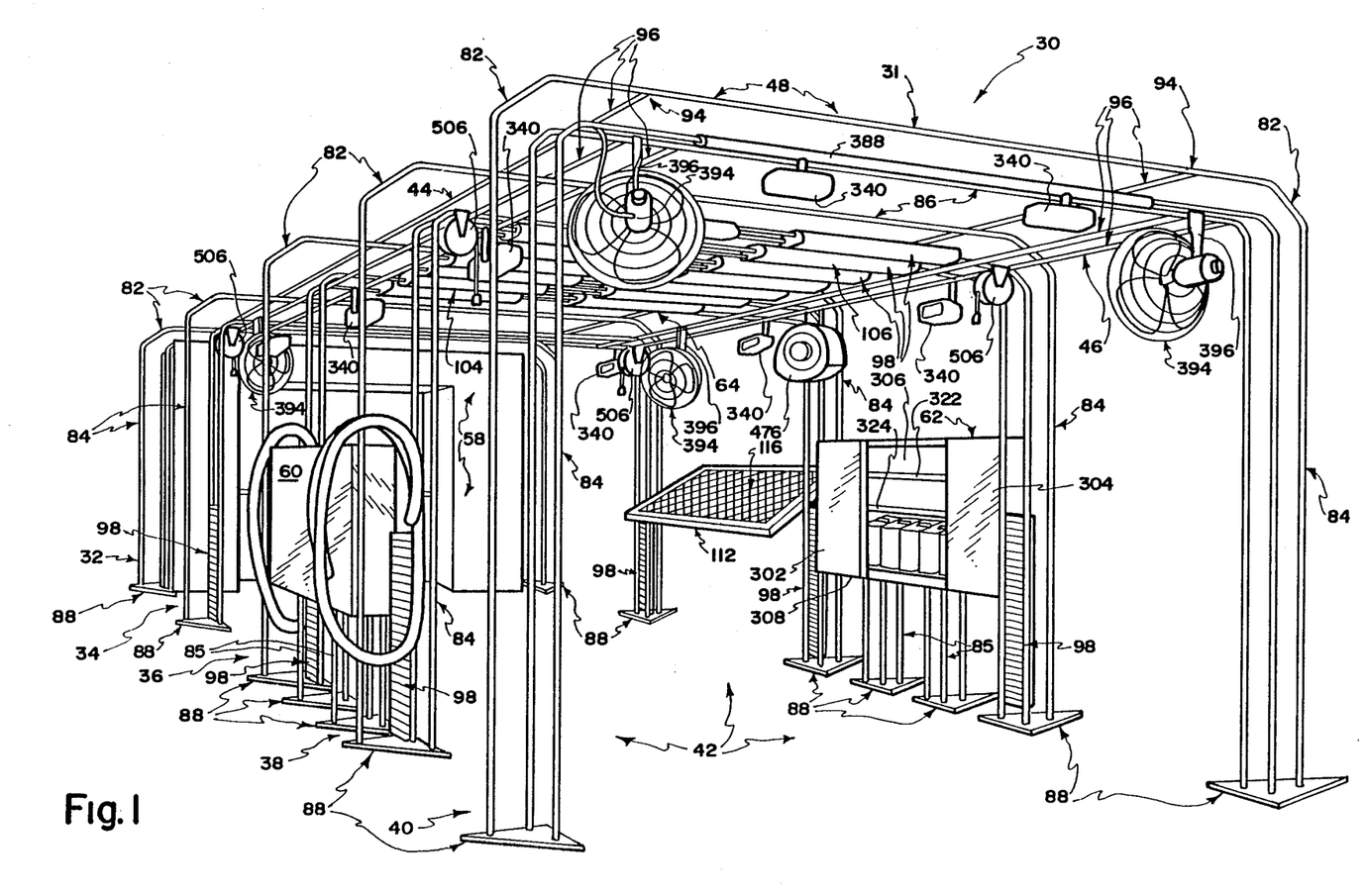
FIG. 1 is a front perspective representation of a preferred integrated auto service center, in the assembled position, according to the present invention.
Figure 2:
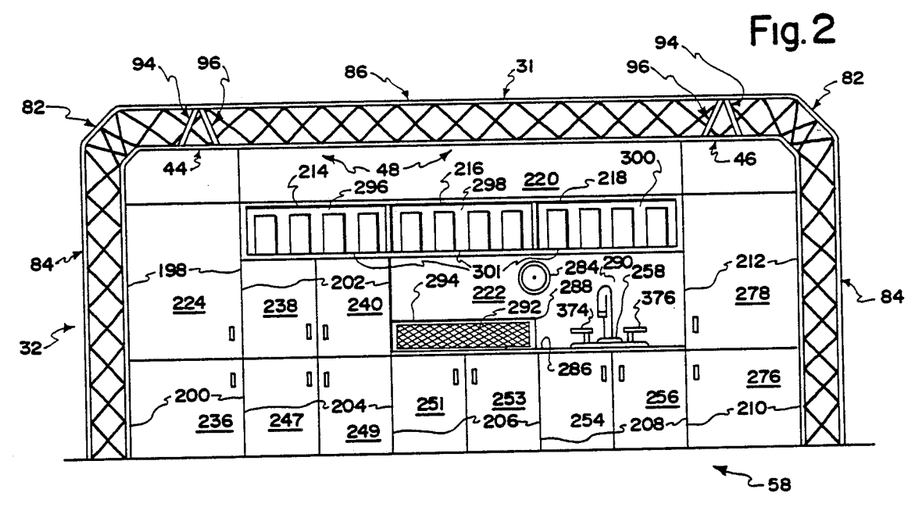
FIG. 2 is a front elevational view, of the auto service center of FIG. 1 illustrating a typical inverted U-shaped frame as well as a large storage and display cabinet illustrated as being located at the rear of the service center.
Figure 3:
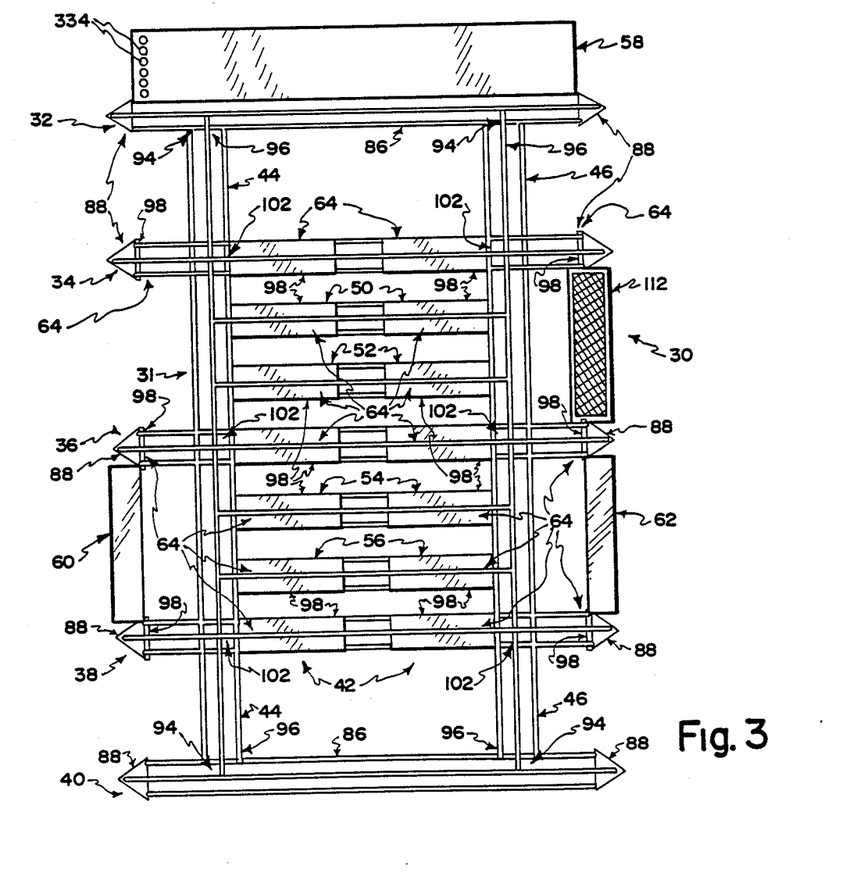
FIG. 3 is a top plan view of the service center of FIG. 1.
Figure 4:
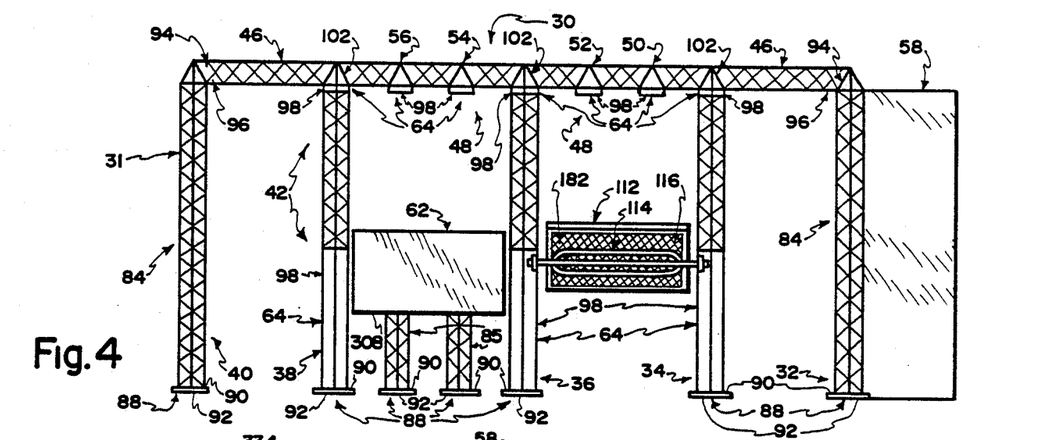
FIG. 4 is a side elevational view of the service center of FIG. 1.

Each of the inverted U-shaped frames 32, 34, 36, 38 and 40 is illustrated as comprising a series of basic Structura modules 66 assembled into the preferred shape. All modules are rigidly connected together by a system of spring-loaded splines 72. Two ninety degree elbow modules 82, also available from Structura, facilitate the transition between the vertical (column) 84 and horizontal (beam) 86 portions of each U-shaped frame 32, 34, 36, 38 and 40, as shown in FIGS. 1 and 2. A flat, triangular, steel, ground, floor or pavement-engaging base plate 88, also available from Structura, is attached to each open end of each U-shaped frame 32, 34, 36, 38 and 40. Thus, the framework 31 is free-standing. This facilitates rapid installation and use without compromising safety. Each base plate 88 connects to the rods 68 of module 66 of the associated column 84 at the top flat surface 90 of the plate 88 by using a spring-loaded spline, while the lower surface 92 lies contiguous with the floor or ground upon which the work unit 30 rests. Thus, plates 88 are bearing or load-transferring plates. Each inverted U-shaped frame 32, 34, 36, 38 and 40 has a preferred height from base plate 88 to crest 48 of approximately nine feet and a preferred width between each base plate 88 of approximately thirteen feet for servicing standard sized automobiles. The total length of the service center 42 is preferably approximately 29 feet for automobiles. These dimensions are easily changed to accommodate larger or smaller vehicles.

The two inverted U-shaped frames 32 and 40, situated at the respective ends of the bay 42, are of identical construction, but opposite hand. Both comprise two base plates 88, two uninterrupted vertical or column portions 84, and a horizontal or beam portion 86 comprising a series of linearly connected basic modules 66 and two T-joint modules 94, available from Structura. Each T-joint module 94 facilitates the connection of three Structura modules such that two of the modules are linearly connected while the third is connected thereto at a right angle. The third connection site comprises stem 96. See FIGS. 1-3. Both T-joints 94 on transverse frames 32 and 40 form the ends of the beam portion 86 and are fastened at one of the transversely-directed connections directly to one of the ninety degree elbows 82. The stem 96 of each T-joint 94 is directed axially parallel to the bay 42. Each stem 96 on member 32 is linearly aligned with its counterpart stem 96 directly opposite on member 40.

Inverted U-shaped frames 34, 36 and 38 are of identical construction. Each comprises two vertical columns 84 and a horizontal beam 86. Each vertical column 84 comprises a base plate 88, a series of linearly assembled basic Structura modules 66 and a specialized Structura lighting module 98 (FIG. 7) outfitted with a fluorescent lighting element 100, hereinafter described in greater detail. Lighting module 98 is attached directly to the module 66 above base plate 88 and thus makes up the lower portion of the vertical columns 84 of frames 34, 36 and 38. The fluorescent lighting element 100 is directed so as to light the interior of the bay 42 when actuated.

Basic modules 66 make up the upper portion of the vertical columns 84. Each horizontal beam 86 comprises a basic module 66, two specialized lighting modules 98 and two X-joint modules 102. Each X-joint 102 facilitates the connection of four Structura modules such that a ninety-degree intersection is formed. See FIG. 3. One transversely-directed end of each X-joint 102 is connected to an elbow module 82 and the opposite end to module 66 comprising beam 86. The X-joints 102 thus comprise the ends of the horizontal beam 86 of frames 34, 36 and 38. At the second transverse end of each X-joint module 102 a specialized lighting module 98 is attached. The fluorescent lighting element 100 is directed downward so as to light the interior of the bay 42. A basic module 66 carries the two light modules 98 on the horizontal beams 86 of frames 34, 36 and 38. The two axially-directed ends of each X-joint module 102 are linearly aligned with and connect to the axial beams which horizontally join frames 34, 36 and 38 to each other and to frames 32 and 40.

The longitudinal or axial beams 44 and 46 are of identical construction but of opposite hand and span between the T-joints 94 and X-joints 102 located on the horizontal beams 86 of inverted U-shaped frames 32, 34, 36, 38 and 40. Beam members 44 and 46 connecting members 32 and 34, and members 38 and 40 comprise only basic Structura modules 66. Beam members 44 and 46 disposed between inverted U-shaped members 34 and 36, and 36 and 38, however, preferably comprise two or more basic modules 66 connected by two T-joint modules 94. These T-joints 94 are situated such that each stem 96 is directed toward the center of the bay 42. Such stems 96 on beam 44 are linearly aligned with and connected by cross-braces 50, 52, 54 and 56 to their counterpart stems 96 on beam 46.

All cross-braces 50-56 are of identical construction, and each comprise one basic module 66 carrying two specialized lighting modules 98. One lighting module 98 is attached to each associated T-joint stem 96 located on the longitudinal beams 44 and 46. Basic modules 66 connect the lighting modules 98 originating from longitudinal beam 44 to the counterparts originating from longitudinal brace 46, thus completing the cross-brace structures 50, 52, 54 and 56. Each fluorescent lighting element 100 within the lighting modules 98 are directed so as to light the interior of the bay 42.

Figure 7:
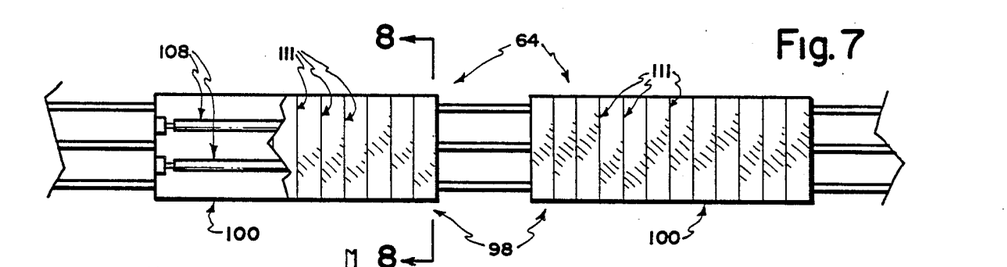
FIG. 7 is a fragmentary bottom plan view, partially broken away for clarity, of two modules into which certain lighting units have been integrated.
Figure 8:
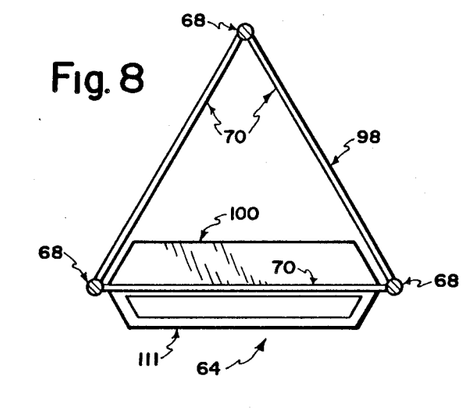
FIG. 8 is an enlarged cross-sectional view taken along lines 8—8 of FIG. 7.

The presently preferred light array 64 comprises the specialized set of lighting modules 98 and set of fluorescent lighting elements 100, mentioned previously. Out of the fourteen lighting modules 98, illustrated as being disposed at the crest of the work bay 48, such comprise two longitudinal rows 104 and 106, each containing seven equally spaced modules 98. The space between each module 98 in row 104 and 106, as presently preferred, is approximately thirty-two inches and the distance between the rows 104 and 106 is approximately sixty-four inches, both measurements taken from center of module to center of module. Each lighting module 98 comprises a four-foot basic Structura module 66 into which a three dimensional lighting element 100 of nearly equal length has been integrated, as shown in FIGS. 7 and 8. The fluorescent lighting element 100 has one open side and contains one red and one blue conventional fluorescent light tube 108, as partially illustrated in FIG. 7. The light array 64 is turned on and off, and the lighting intensity is controlled from a control panel 110, hereinafter described in greater detail. Each lighting element 100 is encased on its open side by antiglare louvers 111 front Structura.

A rotatably adjustable mat-cleaning rack assembly 112 is illustrated as being situated between and supported by the right vertical portions 84 of inverted U-shaped frames 34 and 36, the right side being defined from the vantage point of one looking into the bay 42 while positioned directly beneath inverted U-shaped frame 40. See FIGS. 3, 4, 9, and 10. Mat rack assembly 112 comprises another specialized Structura frame module 114, a relatively large rectangular rack preferably comprising a grating of flat expanded aluminum 116 and a locking mechanism 118, which prevents rotation of the rack 112 when engaged and restricts rotation when disengaged. The pervious nature of the grating accelerates drying of floor mats and the like. The specialized module 114 comprises basic module 66 and two funnel-shaped moduli 120 disposed one at each end thereof. The funnel-shaped moduli 120 have three 9/16 inch arms at one end that connect to the three 9/16 inch rods of the basic module 66. Said three arms converge and terminate at a point 122 which is situated on the rotational axis of the module 114. An aperture 124 runs through the convergence point 122 and facilitates rotational connection of the module 114 to the locking mechanism 118. Approximately three feet above the base plates 88 of both members 34 and 36, the locking mechanism 118 is rigidly bolted to the two vertical rods 68 of the members 34 and 36 that are closest to the mat rack 112.

Figure 10:
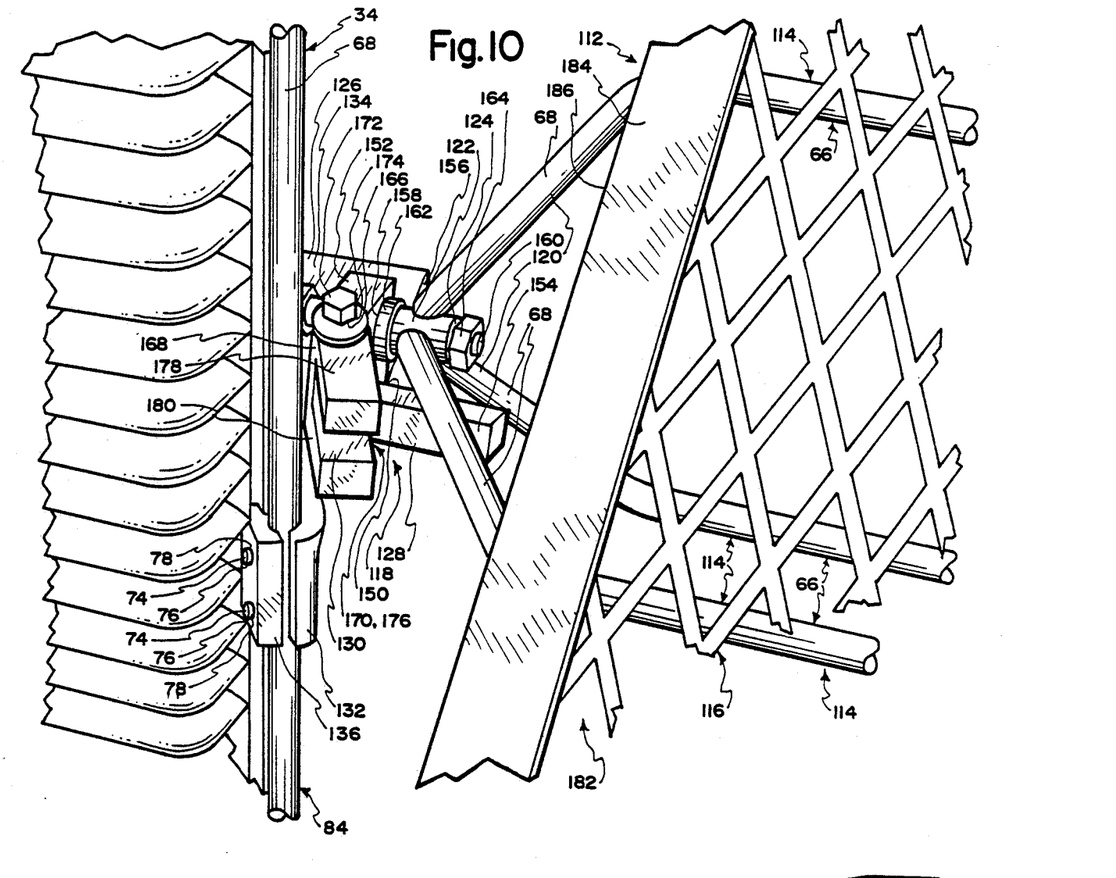
FIG. 10 is an enlarged fragmentary perspective view of a locking mechanism of the mat-cleaning rack assembly of FIG. 9.

As best shown in FIG. 10, each mechanism 118 comprises a bent steel plate 126, a rigid L-shaped steel component 128 and a rotatable C-shaped component 130. The steel plate 126 is disposed at a 90° angle and thus comprises a vertical portion 132 and a horizontal portion 134. Vertical portion 132 is rectangular in shape and has the function of rigidly attaching the plate 126 to the rods 68. That attachment is effectuated by placing a small rectangular plate 136 behind each rod 68 such that the rod 68 is between the plate 136 and the vertical portion 132 of plate 126. Plates 126 and 136 are then rigidly bolted together by two bolts 74 and two nuts 76 through two apertures 78 in the plates 126 and 136. The horizontal portion 134 is triangular in shape and functions as a support structure for the rotatable module 114. The L-shaped component 128 has a square cross-section and is rigidly connected, as by welding at 150, to the horizontal portion 134 of plate 126 such that one leg 152 points vertically upward while the other leg 154 points horizontally toward its counterpart on the opposite plate 126 attached to opposite inverted U-shaped member 34 or 36. The vertical leg 152 is contiguous with the distal edge 156 of the plate 126 and thus the horizontal leg 154 is cantilevered. In the vertical leg, near the top thereof, a fore to aft aperture 158, running the same direction as the horizontal leg 154, is drilled, or otherwise formed. A relatively long bolt 160 extends through aperture 158 beginning from the side of the aperture 158 farthest from the rack 112. The bolt 160 passes through an annular copper washer 162 and the aperture 124 in the convergence point 122 of the module 114. A standard nut 164 is threaded onto the bolt 160 such that bolt 160 is held securely in place but does not restrict rotation of the module 114. The horizontal leg 154 of the L-shaped component 128 is long enough to extend between two of the converging rods 68 of "funnel" module 120, thus restricting rotation about the longitudinal axis of module 114 to approximately 120 degrees.

C-shaped component 130, having a rectangular cross-section and preferably made of aluminum, is mounted on the horizontal portion 134 of plate 126 near the distal edge 156 thereof between L-shaped component 128 and the vertical rod 68 nearest the mat rack 112. A vertical fore-to-aft aperture 166 runs through the base portion 168 of component 130. Another aperture 170 through the horizontal portion 134 of plate 126 is aligned with aperture 166. A standard bolt 172 passes through a flat annular aluminum washer 174 and apertures 166 and 170. A standard nut 176 at the end of bolt 172 secures the C-component 130 to the plate 126. However, C-component 130 is free to rotate about the bolt 172. The component 130 is engaged by aligning one of the converging rods 68 of module 114 between the two arms 178, 180 of the C-component 130. This prevents rotation of module 114.

Figure 9:
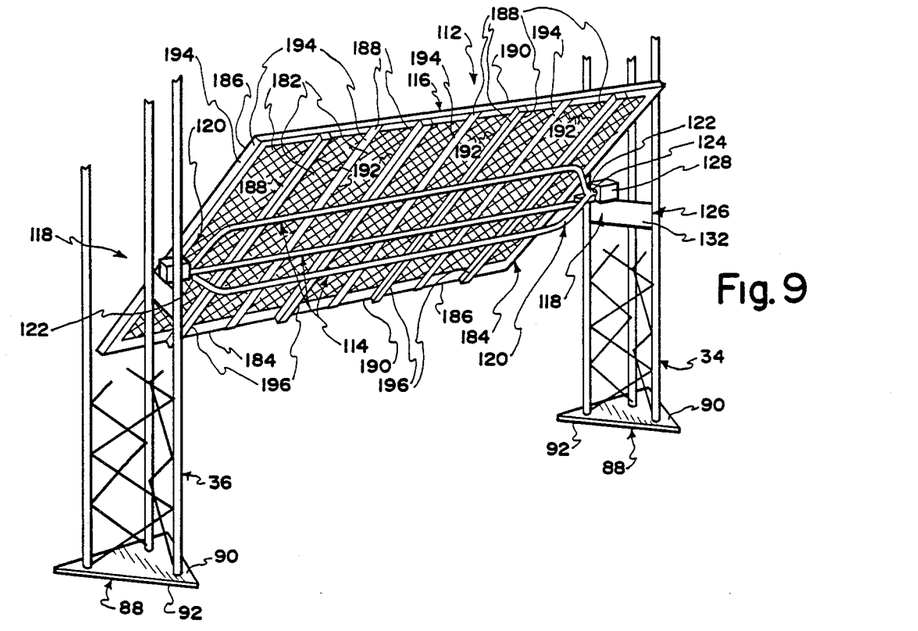
FIG. 9 is a fragmentary enlarged perspective representation of a rotatable mat-cleaning rack assembly of the auto service center of FIG. 1.

Aluminum rack 116 comprises a large flat rectangular sheet of aluminum grating 182 framed by a series of aluminum angles 184 and 188. Some of the angle irons 184 are rigidly attached about the periphery 186 of the perforated aluminum 182 so as to overlap, the angles 184 laying on top of the perforated sheet 182. The remainder of angles 188, extend from edge to edge of the width of the rack 116 spaced at intervals of about one foot. There are presently seven angles 188. While the horizontal portions 190 of the angles 184 and 188 are contiguous with the sheet 182, the vertical portions 192 of the angles 184 and 188 are of varying depths. Angles 184 and three of the seven angles 188 have the same depths 194 which is approximately equal to that of corresponding horizontal portion 190. Four of the seven angles 188, on the other hand, have a depth 196 equal to approximately twice the depth 194 of the other angles. Those four angles are alternated with the other three comprising angles 188. All angles 184 and 188 are rigidly attached together as by welding. The perforated aluminum sheet 182 is attached to the angles 184 and 188 at various locations by means of standard rivets. Aluminum rack 116 is rigidly attached lengthwise to two of the 9/16 inch rods 68 of module 114 as by standard welding such that when C-component 130 is disengaged, the rack 116 rests vertically by force of gravity. When component 130 is engaged, the rack 116 is set at an angle approximately 45 degrees from vertical for convenience of use. The welds effectuating the attachment of rack 116 to module 114 are at the contact points where each of the vertical portions 192 of the four angles 188 of greater depth 196 bisect one of the two 9/16 inch rods 68. Various clips and brushes are adjacent to the mat rack assembly 112 for convenience in the cleaning and maintenance of vehicular mats and carpets. The slope of the rack allows soap and water and other liquids used to clean the mats to run quickly from the rack and the grating accommodating rapid drying of mats.

Various lengths and mat rack designs may be used depending on the application. For instance, in the drive through model the mat rack may be small because of space limitations.

Large free standing cabinet 58, best shown in FIGS. 1, 2, 11 and 12, is illustrated as being located at one end of the work bay 42 contiguous with inverted U-shaped frame 32. However, cabinet 58 can also be placed in alignment with either side of the service center when a drive-through utilization is contemplated. The perimeter dimensions of cabinet 58 are illustrated as being substantially identical to those of frame 32, i.e., in the preferred automobile embodiment, a height of approximately thirteen feet and width of approximately thirteen feet. Additionally, cabinet 58 preferably has a fore-to-aft depth of approximately three feet. Large cabinet 58 may be fabricated from cabinet grade fiberboard sprayed with a treatment known in the industry as Koretron, and is available from Towne & Country Cabinet Design, manufactured by The Kitchen Co. of Salt Lake City, Utah. Cabinet 58 comprises enclosed rectilinear storage areas 198, 200, 202, 204, 206, 208, 210 and 212, combined display and storage areas 214, 216 and 218, graphics strip 220 and sink bay 222. The following descriptions are made from the vantage point of one looking at the cabinet 58 from the front as defined by standing in the work bay 42. See FIG. 2. Storage area 198 is situated in the left central region of cabinet 58 and is accessed by a single nonlocking door 224, which opens from right to left. As illustrated, area 198 has approximate dimensions of five feet in height, two feet in width and three feet in depth. Storage area 198 is shown to contain an electrical junction box 226, mounted on left side wall 228, and a self-contained vacuum source 230, mounted on the rear wall 232, both hereinafter described in further detail. See FIG. 11.

Figure 11:
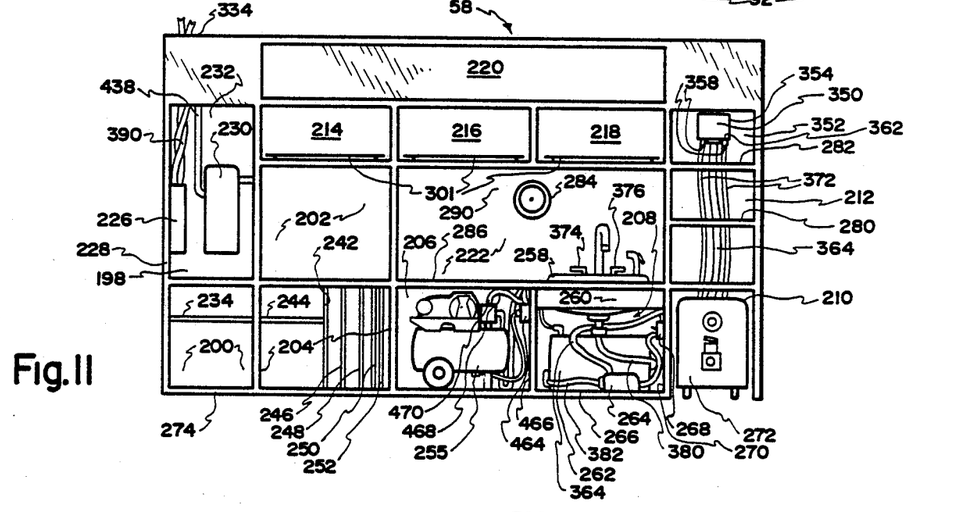
FIG. 11 is a front elevational view of a large storage and display cabinet of the service center of FIG. 1 taken with the doors thereof removed for clarity of illustration of certain features.
Figure 12:
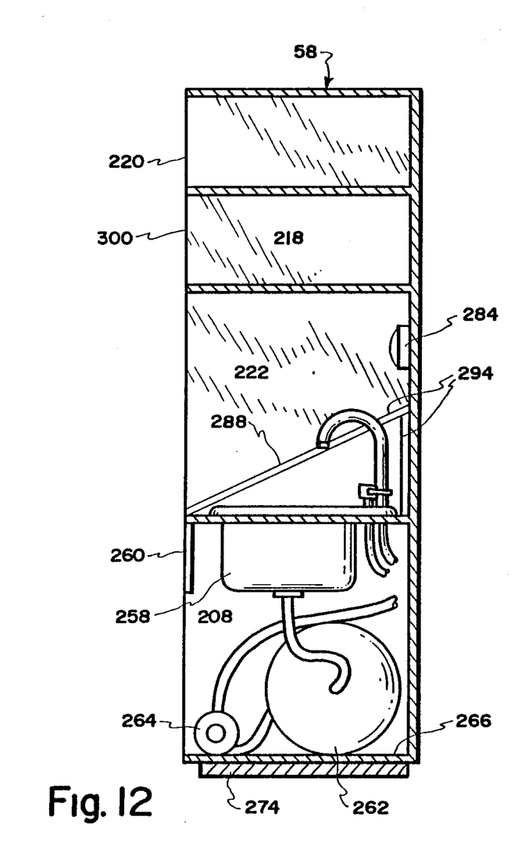
FIG. 12 is an enlarged cross-sectional view taken along lines 12—12 of FIG. 11.
Figure 13:
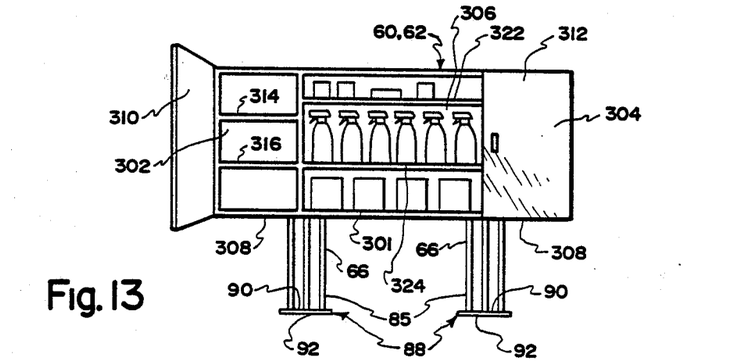
FIG. 13 is a front elevational view of one of two identical small storage and display cabinets situated on each side of the service center of FIG. 1, with one cabinet door illustrated in an open position.

Directly below area 198 is storage area 200, which is illustrated as having approximate dimensions of three feet in height, two feet in width and three feet in depth. Area 200 is separated into two sections by a horizontal shelf 234 and is accessed by a single nonlocking door 236, which opens from right to left. Storage area 200 is preferably used to store auto service products.

Storage area 202 is located directly to the right of, and adjacent to, area 198 and has approximate dimensions of three feet in all directions. See FIG. 2. Two identical and opposite hand doors 238, 240 provide access to area 202, which stores various and sundry detailing products. Storage area 204 is situated directly below area 202 and directly adjacent to area 200. Both areas 200 and 204 have an approximate height and depth of three feet. However, area 204 has a width of about three feet. Vertical divider 242 separates area 204 into two nearly-equal sections. To the left of the divider 242, horizontal shelf 244 in turn divides the left-hand section into two sections. To the right of the divider 242, the right-hand section is further vertically divided four equal time by dividers 246, 248, 250 and 252. Storage area 204 is accessed by two identical and opposite handed doors 247, 249.

Storage area 206 is directly adjacent to area 204 on the right side and has dimensions and double doors 251 and 253 identical to area 204. However, area 206 is not further internally subdivided, as is area 204, but rather houses a portable air compressor unit, hereinafter described in further detail. Storage area 208 is directly adjacent to area 206 and has identical dimensions and doors 254 and 256. The top portion of area 208 houses the well of a sink 258, hereinafter described in greater detail. A slat or style 260, about six inches high and running the width of area 208, covers the sink 258 from view when the doors 254, 256 are open. In the lower portion of area 208 a waste water holding tank 262 and pump 264 are permanently attached to the floor 266 of area 208. Waste water from tank 262 can be periodically pumped to an adjacent drain in a building or the like or to a tank truck for remote disposition. A switch 268, which operates the pump 264, is attached to the right side wall 270. The switch 268, pump 264 and holding tank 262 are likewise described more completely hereinafter.

Storage area 210 is disposed adjacently to the right of area 208. Its approximate dimensions are three feet in height, two feet in width and three feet in depth. Therein is stored a portable shampooer 272 of conventional make-up, hereinafter described in greater detail. Storage areas 200, 204, 206 and 208 are situated at the bottom of the cabinet 58 atop a toe 274 and thus are not contiguous with the floor or ground. Area 210 does not have a separate floor of its own, and thus an operator can easily roll out the carpet shampooer 272 from storage area 210 and place it at the most conveient location for use in respect to a vehicle being serviced. Storage area 210 is accessed to by one door 276, which is hinged on the right and, therefore, opens from left to right.

Finally, storage area 212 is situated directly above area 210. It has dimensions of about five feet in height, two feet in width and three feet in depth, and is accessed by a single door 278, which opens from left to right. Area 212 is separated into three nearly-equal vertically-stacked sections by two horizontal shelves 280 and 282.

All door handles used to access the storage areas 198–212 are identically nonlocking and nonengaging, and preferably comprise a simple C-shaped section of metal rigidly attached to the door. Other locking devices are available and may be used. The preferred door hinges are known in the industry as Blum hinges.

Sink bay 222 is located directly above storage areas 206 and 208, and adjacent to and between storage areas 202 and 212. The bay 222 has dimensions of approximately three feet in height, six feet in width and two feet in depth, and comprises a sink 258, a clock 284 and a countertop 286. A second, relatively small, portable mat rack assembly 288 is illustrated as being placed above the countertop 286 at the operator's option. The sink 258 is disposed at the right hand portion of the bay 222 and the top thereof lies flush with the countertop 286. The well of sink 258, as previously mentioned, is located in storage area 208. Sink 258 is standard in all respects. How the sink 258 relates to the remainder of the independent plumbing system is described hereinafter in further detail.

Clock 284 is of standard make and is mounted on the rear wall 290 of sink bay 222, preferably centered near the top thereof. Countertop 286 is a flat, horizontal section of sink bay 222 to be used to the operator's convenience. The mat rack assembly 288 rests atop the countertop 286. Assembly 288 is illustrated as comprising a sheet of aluminum grating 292 and a frame comprising aluminum angle irons 294. The angles 294 are fashioned into a wedge-shaped frame, being rigidly attached together by standard welding. The grating 292 is attached to one of the two long sides of the wedge frame by standard rivets. When in use, the vertex of the wedge-shaped rack assembly 288 is placed towards the front of countertop 286. Preferably mat rack assembly 288 is tiltable using pivot and lock mechanisms of the type described in respect to rack 112.

Display and storage areas 214, 216 and 218 are located directly above sink bay 222 and storage area 202, and adjacent to and between storage areas 198 and 212. The three areas 214, 216 and 218 are identical and are situated directly adjacent to each other. Each area 214, 216 and 218 has approximate dimensions of one foot in height, three feet in width and two feet in depth. The display and storage areas 214, 216 and 218 are encased on the front side with glass doors 296, 298 and 300, which accommodate display the various vehicle servicing products available for use. The glass doors 296, 298 and 300 are identical and are situated on a track 301. The areas 214, 216 and 218 are opened and closed by sliding the doors 296, 298 and 300 along a track 301. The track 301 is known within the trade as Blum KV aluminum gliders.

The graphics strip 220 is situated directly above the display and storage areas 214, 216 and 218, and is used to headline trademarks and advertising. The strip 220 is approximately one foot in height and nine feet in width, and comprises simply a continuous unencumbered area of the cabinet 58.

The side cabinets 60 and 62, as shown in FIGS. 1, 3, 4 and 13, are identical though oppositely oriented and, therefore, only one need be described herein. Both cabinets 60 and 62 are floor, pavement or ground supported in a free-standing manner and are located between inverted U-shaped frames 36 and 38. Also, both are preferably constructed out of and treated with identical material as that used in cabinet 58. Each cabinet 60, 62 comprises two modules 66 serving as intermediate legs 85 or supports, two enclosed storage areas 302 and 304, and a glass-covered display and storage area 306. Each module 66 of legs 85 is approximately two feet in height and rests atop a base plate 88, which is contiguous with the floor on the under side 92 and fastened to the module 66 comprising the associate leg 85 on the top side 90. The top end of each module 66 comprising each leg 85 is rigidly bolted or fastened to the under side 308 of the cabinet 60, 62. The storage and display portions of cabinet 60, 62 have total dimension of approximately three feet in height, eight feet in width and one foot in depth. Storage areas 302 and 304 are identical, but of opposite hand, and are located at each end of the cabinet 60, 62. Each has dimensions of about three feet in height, two feet in width and one foot in depth. Both areas 302 and 304 are accessed by doors 310, 312 that open to the outside and which have the same hinges and handles as found on doors of large cabinet 58. However, these may be replaced with sliding mirror doors. Each area 302, 304 is divided into three nearly-equal sub-areas by horizontal shelves 314 and 316. Glass-encased display and storage area 306 is located between the storage areas 302 and 304. It has approximate dimensions of three feet in height, four feet in width and one foot in depth. As the other storage area 302 and 304, area 306 is divided into three separate sections by two horizontal shelves 322 and 324. The same sliding glass door assembly previously described in connection with the display and storage areas 214, 216 and 218 of large cabinet 58 is used to access area 306.

Figure 14:
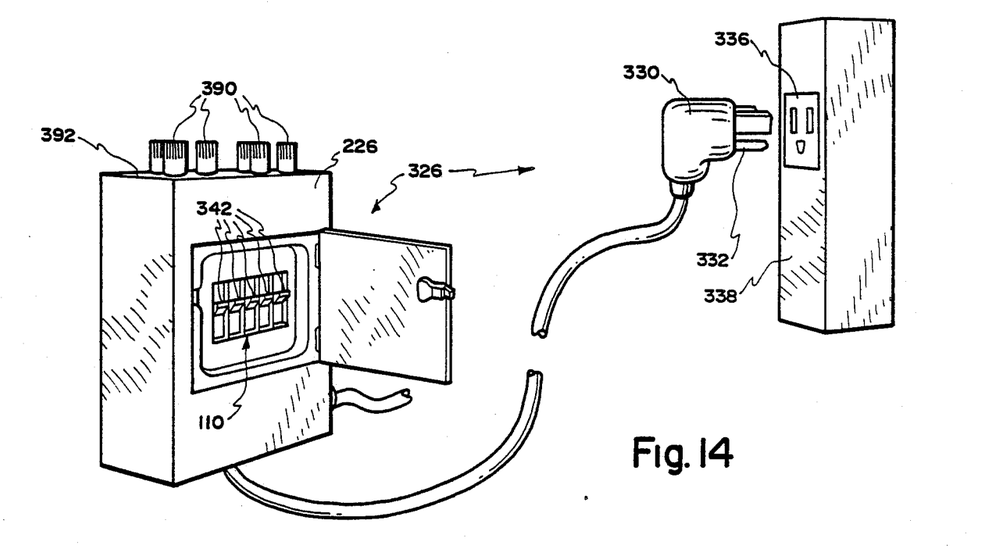
FIG. 14 is a perspective representation of a self-contained electrical system of the service center of FIG. 1.

Service center 30 contains a self-contained electrical wiring system 326 such that all vehicle servicing equipment requiring electrical power receives such power directly from master electrical box 226. See FIG. 14. The service center 30 receives its electrical power at box 226 directly from an external commercial source 338 via socket outlet 336. Socket 336 may be a standard 110 volt or a 220 volt outlet, if desired, through which all electrical power is routed to junction box 226, which, as previously described, is mounted in storage area 198 of cabinet 58. All electrically powered equipment of service center 30 may be operated on a standard 110 volt power, although 220 volt equipment are also within the scope of the present invention. Each piece of electrically powered equipment, hereinafter described in further detail, is connected via standard circuits to the junction box 226 so as to receive power therefrom. A single electrical pig tail 330 with standard plug 332 communicates electrical power to the junction box 226. Each circuit of the service center 30 is illustrated as being a conventional 110 volt circuit. Junction box 226 also serves as a control center 110 for light array 64, as well as various halogen light sources 340, hereinafter more completely described. Standard dimmer switches 342 allow for varying intensities of light to provide for the desired light mix for clarity of color and full illumination.

Figure 15:
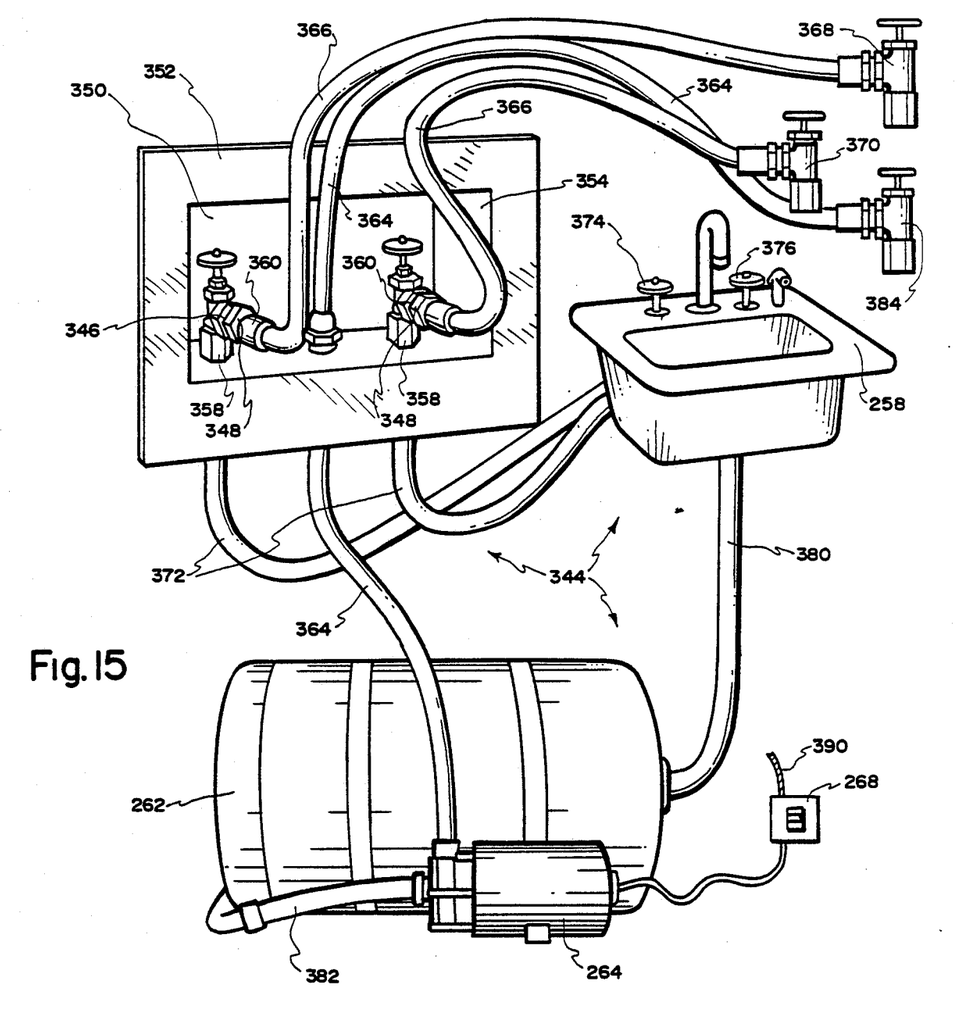
FIG. 15 is a perspective representation of a self-contained plumbing system of the service center of FIG. 1.

An independent, self-contained plumbing system 344 is also contained in work unit 30. See FIG. 15. System 344 comprises hot and cold water hook-ups 346 and 348, holding tank 262, water pump 264 and sink 258. Hot and cold water hook-ups, 346 and 348 are located in a small alcove 350 situated in the rear wall 352 near the top of storage area 212 in cabinet 58. The alcove 350 comprises a nearly-square three-sided box 354 which dimensions of approximately one foot which has been securely bolted to the cabinet 58. An aperture is cut or otherwise formed in the rear wall 356 of cabinet 58 to accommodate placement of the box 354. Alcove 350 is accessible only from the rear 356 of cabinet 58. The hook-ups 346 and 348 are identical and comprise standard faucets, with inlet and outlet nozzles 358 and 360, anchored to the base of the alcove 350. Inlet nozzles 360 are located inside the alcove 350 while outlet nozzles 358 extend through its base 362 into storage area 212. Between the two hook-ups 346 and 348 a hose 364 also extends through from the alcove 350 into area 212. Inlet nozzles 360 are both connected to hoses 366 which are connected at the opposite end to external hot and cold water sources 368 and 370. The outlet nozzles 358 are connected to hoses 372, which lead to and are connected with the hot and cold water taps 374 and 376 located at the sink 258. Hoses 372 are contiguous with the rear interior wall 378 of cabinet 58 as they proceed from outlet nozzles 358 in area 212 downward into area 210 and turn into area 208 where the top connections 374 and 376 to sink 258 are located. Sink 258 drains via hose 380 into a holding tank 262 situated, as previously mentioned. Holding tank 262 is connected to pump 264 by another hose 382. The pump 264 is in turn attached to hose 364 which follows the same route as hoses 372 to alcove 350 before being connected to an external drainage source 384. Thus, water is brought in from an external source 368, 370 to hook-ups 346, 348, thence to sink taps 374, 376, thence to holding tank 262, and is thence pumped into an external drainage source 384. Pump 264 is operated manually by activating electrical switch 268. Therefore, holding tank 262 is emptied by the operator only on an as needed basis. The presently preferred holding tank 262 is manufactured by Emerson and the preferred pump 264 is distributed by American Excess Corp. The pump capacity thereof is 30 gallons per minute.

Figure 16:
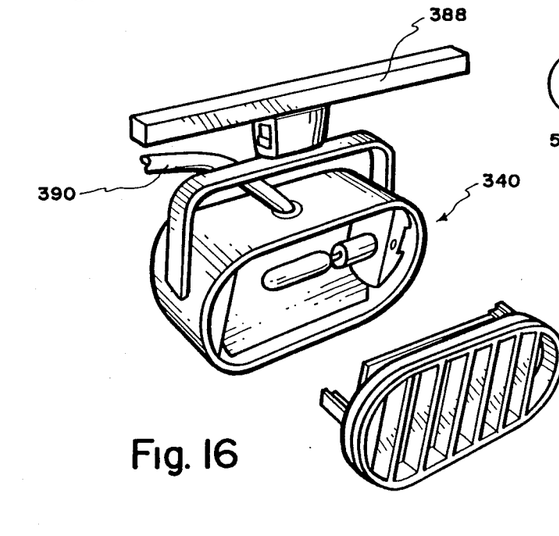
FIG. 16 is a fragmentary perspective representation of one of the several light sources located about the periphery of the service center of FIG. 1.

Ten halogen light sources 340 are mounted on and about the work unit 30, one of which is illustrated in FIG. 16. Each light source 340 is illustrated as being mounted on a Lytespan Track 388. Direct mounting to the framework is also contemplated. Two light sources 340 are located at approximately five foot intervals on the horizontal portion 86 of both inverted U-shaped frames 32 and 40. Three light sources 340 are disposed on each of the longitudinal braces 44 and 46 at points where those braces 44 and 46 intersect inverted U-shaped frames 34, 36 and 38. A Lytespan Track 388, which is basically a long thin steel rod, is illustrated as being placed within and attached to the triangular modules 66 comprising the horizontal portion 86 of both members 32 and 40. Also, a Lytespan Track 388 is illustrated as being placed within and attached in like manner to the triangular modules 66 comprising each longitudinal brace 44 and 46. Power is delivered to each of the light sources 340 by wires encased in conduits 390. As a general rule, the wires and conduit 390 exit the junction box 226 from the top end 392, thereof and proceed thence to exit from storage area 198 through the apertures 334. The wires and conduit 390 are then routed to the light sources 340, or other equipment described more fully hereinafter, through the interior of the triangular modules 66 as needed. Electrical power for the light array 64 is obtained in the same manner. As indicated previously, junction box 226 also serves a control panel 110 for light array 64 and light source 340. The light sources 340, as well as the Lytespan Track 388 are both available from Lightolier, Inc.

A two foot diameter fan 394 is situated near each of the four corners of the service center 30. Each fan 394 is illustrated as being suspended by a strut 396 from a longitudinal brace 44 or 46 near its intersection with inverted U-shaped frame 32 or 40, although other mountings could be used. See FIG. 17. Fans 394 speed the drying process of certain surface treatment products, help eliminate dust from settling on the car surface, help keep the workers cool in warm climates and maintain a cool surface on the car during hot periods. The struts 396 comprise a relatively long, flat piece of steel bent approximately thirty degrees about its longitudinal axis at or near the midpoint 398. The top end 400 of strut 396 is bent so as to form a loop 402 which is wrapped about one of the lower 9/16 inch rods 68 of longitudinal brace 44 or 46. Two linearly aligned apertures, one 404 at the beginning of loop 402 and the other 406 at the end of loop 402, facilitate fastening the strut 396 to longitudinal brace 44 and 46 by allowing passage therethrough of a bolt 408 which is secured by a nut 410. The bottom end 412 of strut 396 also contains an aperture 414. The fan 394 contains a short strut 416 located on top of the housing 418 containing the motor 420. An aperture 422 in the fan strut 394 is aligned with aperture 414 in strut 396 so as to receive a bolt 424 secured by a nut 426. The vertical angle 428 at which the fan 394 is set is adjusted by loosening and tightening nut 426 and bolt 424. The on/off switch 430 for fan 394 comprises a string fastened at one end to the fan 394 and hanging freely from the other end, which end is pulled to alternately turn fan 394 on and off. Electric power is supplied to each fan 394 by inserting its plug 432 into one of two standard 110 volt outlets 434 located along both of the longitudinal braces 44 and 46. These outlet 434 are supplied with power by the wires and conduits 390 emanating from the junction box 226. Presently preferred fans 394 are manufactured by Dayton Electronic of Chicago, Illinois. Fans 394 are used to place and maintain the surface temperature of the vehicle being serviced for optimum surface treatment results based upon whichever surface treatment product is used.

As previously mentioned, vacuum source 230 is securely attached to the rear wall 232 of storage area 198 in cabinet 58. See FIG. 18. Its power is received directly from junction box 226 by a standard 110 plug/outlet combination 436. Vacuum hose 438 serves as a conduit between three vacuum outlets 440, 442 and 444. Hose 438 is securely fastened to vacuum source 230 at one end and proceeds thence upwards and through one of the apertures 334 located in the top of storage area 198, thence through the interior of the triangular cross-section of longitudinal brace 44 to the intersection of brace 44 and inverted U-shaped frame 36, where a four-way junction 446 is located. One leg 448 continues along brace 44 to inverted U-shaped frame 38 where it turns abruptly and proceeds down through a vertical portion 84 of that member. The outlet 440 to leg 448 is located on the underside 450 of side cabinet 60, to which it is rigidly attached, at the end next to frame 38. A flexible hose 452 is temporarily attached to the outlet 440 by means of friction. As with the other vacuum outlets, the vacuum source 230 is activated simply by raising the end cap 456 of outlet 440 which action is a necessary preliminary step in attaching flexible hose 452. An additional switch may be used to control vacuum by hand from the Structura upright located centrally on each side.

Figures 17, 18:
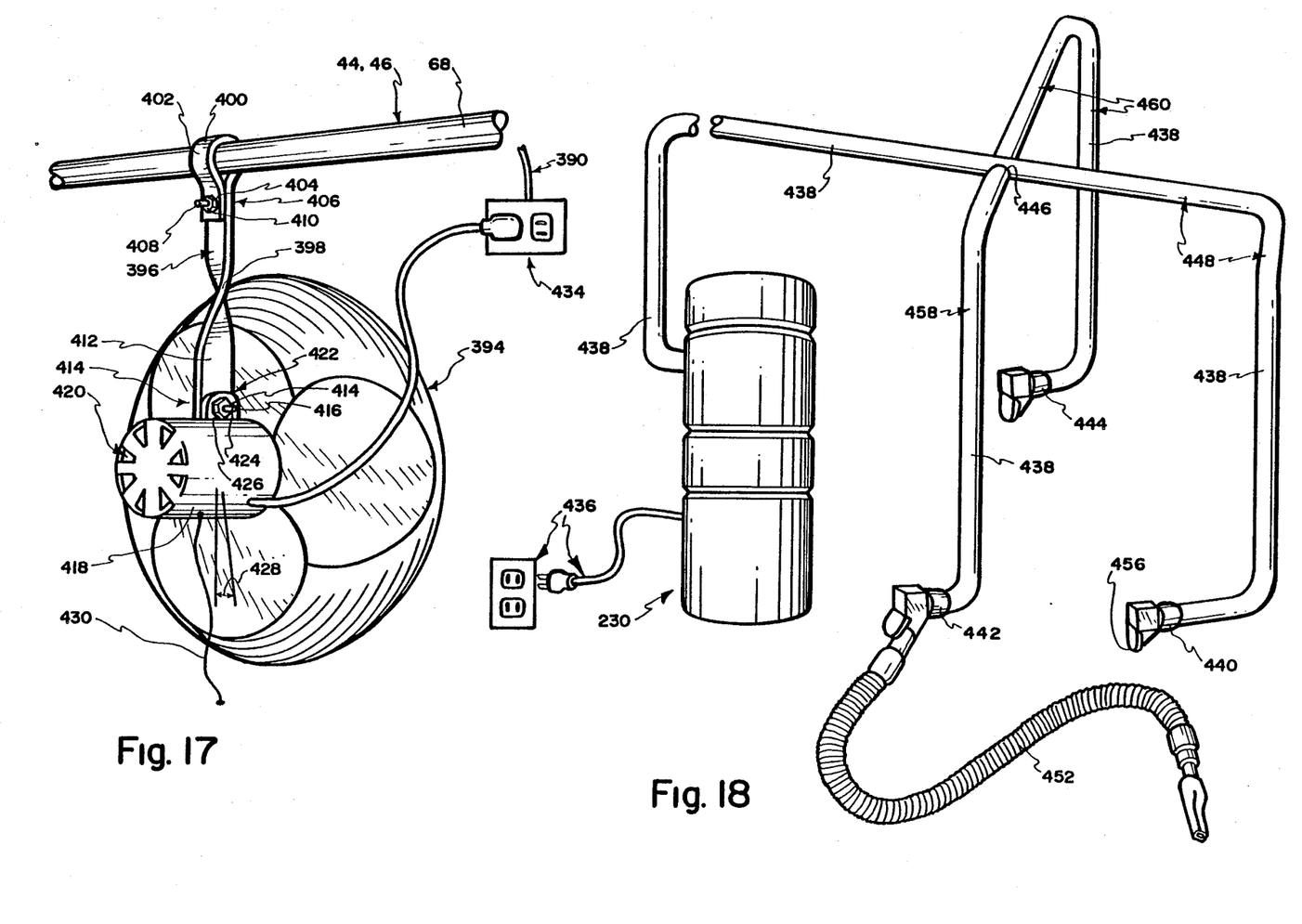
FIG. 17 is a fragmentary perspective view of one of several rotary fans preferably located near each of the four corners of the service center of FIG. 1.
FIG. 18 is a perspective representation of a self-contained vacuum system and accessories of the service center of FIG. 1.

Legs 458 and 460 proceed in opposite directions from junction 446 through the interior of inverted U-shaped frame 36. Leg 458 is attached at outlet 442 to the underside 452 of side cabinet 60 at the end adjacent to frame 36 in a manner similar to that of leg 448. Leg 460 proceeds across the bay 42 through member 36 to side cabinet 62, where it is securely attached at outlet 444 to that cabinet's underside 462 at the end adjacent member 36 in the same manner as at outlets 440 and 442. Various attachments may be temporarily connected to flexible hose 452 for convenience and efficiency in vehicle servicing. Preferred vacuum source 230 is from Vacuflo Vacuum Systems by Build-In Vacuum Systems of Salt Lake City, Utah.

Figures 19, 20:
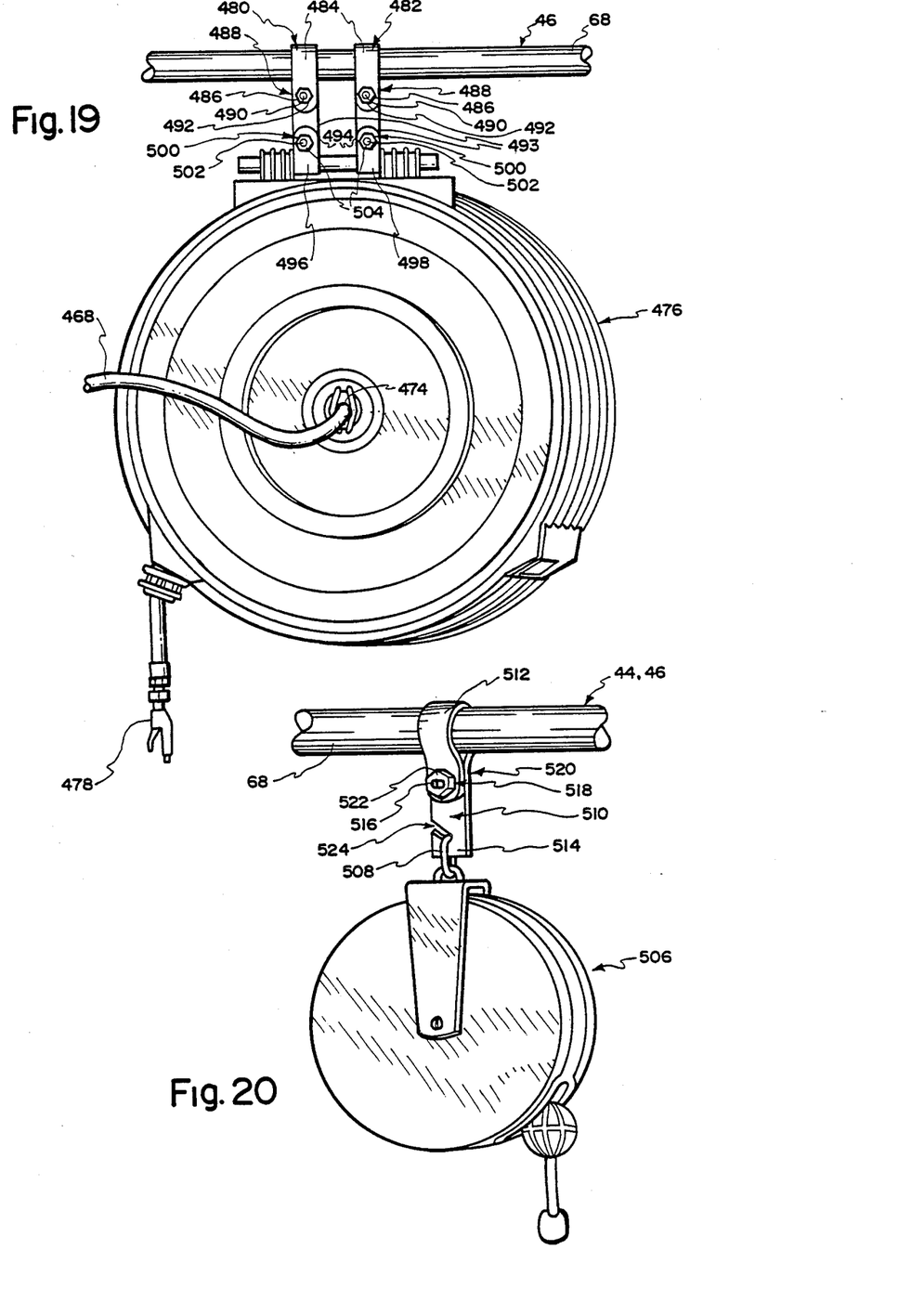
FIG. 19 is a side elevational view of a retractable air compressor hose and valve unit of the service center of FIG. 1.
FIG. 20 is a side elevational view of one of several retractable 110 volt outlets situated about the periphery of the service center of FIG. 1.

A self-contained portable air compressor 252 is located in storage area 206 of large cabinet 58, as shown in FIG. 11. The preferred model is presently a Rand 4000 available from Worldwide Ingersoll/Rand of North Carolina. Power is supplied to the air compressor 252 by plugging into an outlet 464 mounted on the right hand wall 466 of area 206. The outlet 464 is connected to junction box 226 by wire and conduit 390. The same electrical circuit which supplies power to outlet 464 continues into storage area 208 of cabinet 58 and supplies power to switch 268 and pump 264. Air hose 468 is connected at one end 470 to the air compressor 252. It then proceeds into area 208 from which point it follows the same route to alcove 350 as followed by hoses 372. Rather than entering alcove 350, air hose 468 exits the large cabinet 58 through an aperture 472 in the roof thereof, after which it is routed through the interior of the triangular cross-section of longitudinal brace 46 until it intersects with inverted U-shaped member 36. The other end 474 of air hose 468 is attached to a retractable air hose reel and valve unit 476 which is suspended from longitudinal brace 46. See FIG. 19. The unit 476 is known in the industry as a Retracta Auto-Rewind Hose Reel and has the advantage of automatically rewinding excess hose that may otherwise be unwieldy and dangerous when left unwound. A standard air valve 478 is placed at the distal end of the Retracta Unit hose. Retracta unit 476 is suspended from brace 46 by two struts 480 and 482, both similar in construction to strut 396 from which fan 394 is suspended. The top end 484 of both struts 480 and 482 are looped about one of the lower 9/16 inch Structura rods 68 of brace 46. Two linearly aligned apertures, one at the beginning of each loop 486 and 488 at the end of each loop, facilitate fastening the struts 480, 482 to brace 46 by allowing passage therethrough of a bolt 490 which is secured by a nut 492. The lower end 493 of struts 480 and 482 also contains an aperture 494. Retracta unit 476 contains two short strut 496 and 498 located at the top thereof. An aperture 500 in both struts 496 and 498 are aligned with aperture 494 in the lower portion 493 of both struts 480 and 482 so as to receive a bolt 502 secured by a nut 504.

For standard 110 volt, commercially available, automatically retractable extension cord units 506 are also illustrated as being suspended from longitudinal braces 44 and 46, one approximately two feet inwards toward the center of the bay 42 of each fan 394. See FIG. 20. Presently preferred extension cord units 506 are manufactured by Dayton Electric Mfg. Co. of Chicago, Illinois and are capable of extending the reach of a 110 volt electrical power outlet up to thirty feet. Power is supplied to the extension cord units 506 by wires and conduits 390 emanating from the junction box 226. Each unit 506 is equipped by the manufacturer with a metal ring 508 from which it can be suspended. A notched strut 510 facilitates suspension of the unit 506 from one of the 9/16 inch rods 68 of longitudinal braces 44 and 46. Strut 510 comprises a short flat steel bar with an upper portion 512 and a lower portion 514. The upper portion 512 of strut 510 is looped about a 9/16 inch rod 68 and then secured, similar to struts 396 securing fans 394, by a bolt 516, which passes through aligned apertures 518 and 520 in the strut 510, and nut 522. The lower portion 514 of strut 510 contains a notch 524 which receives and securely holds by force of gravity the metal ring 508.

Figure 21:
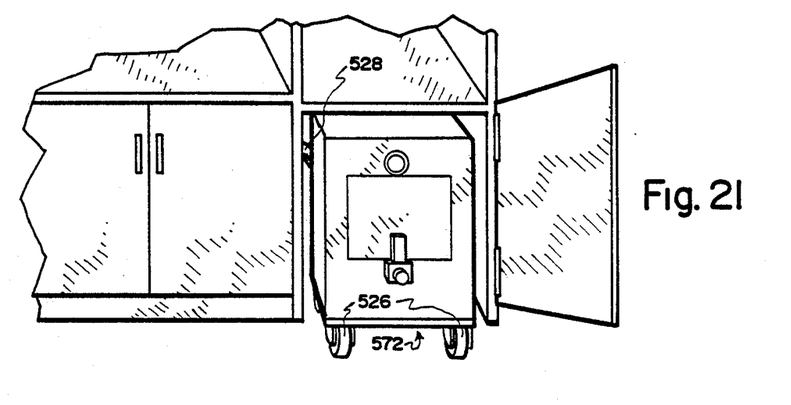
FIG. 21 is a perspective view of the carpet cleaning machine illustrated as being stored in the large cabinet of the service center of FIG. 1.

A self-contained, portable carpet cleaning machine 272, of conventional type, is stored in area 210 of large cabinet 58, as indicated earlier. The original machine 272 is manufactured by Steam Machine Sales and Service located in Salt Lake City, Utah. However, a more powerful machine may replace the Steam Machine, such as those manufactured by Century 400 of Fountain Valley, California. Since the machine 272 is mounted on wheels 526, it is easily removed from and replaced back in storage area 210. Electric power is supplied to the carpet steam-cleaning machine 272 by means of an extension cord 528 which has been threaded through storage area 208 and into storage area 206 where it is plugged into outlet 464 mounted on the right hand wall 466.

Figure 23:
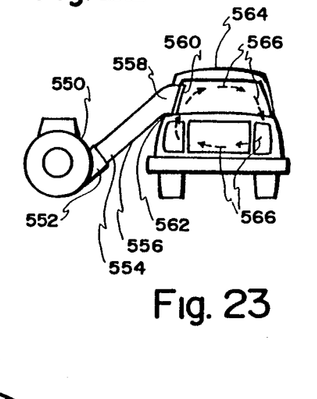
FIG. 23 is a schematic of a blower system of the service center of FIG. 1 for drying the interior of a vehicle.

Additionally, a fan such as a Hurricane 25 unit with a tube made of parachute material which attaches to the car window as shown in FIG. 23 aids in drying the car's interior after cleaning. More specifically, blower 550 comprises an air outlet 552 which is conventionally attached in air tight relation to the proximal end 554 of an impervious fabric tube or chute 556. The distal end 558 is illustrated as comprising a rectangular frame 560 which is placed within the window 562 of a vehicle 564, when the window is down. When the window is raised so as to close upon the chute 556 at the distal end, the frame 560 prevents the tube 556 from being inadvertently separated from the vehicle. Air delivered under pressure from blower 550 via tube 556 dries the interior of the vehicle after cleaning, shampooing and the like as air circulates in the vehicle as illustrated by arrow 566.

A heater can be associated with the blower if desired where acceleration in drying time is needed.

It is to be appreciated that the three different types of light sources may be selectively turned on and off and the illumination of each controller in such a way as to produce a light mix which provides extraordinary illumination and reflects the true color or colors of the painted surface of the vehicle being serviced. The lights in question are specialized high-tech quartz halogen light sources and fluorescent light sources. The use of two fluorescent sources of different types are preferably Phillips S4054 Ultralume 5000 fluorescent lamps, which bring out or accentuate the cool colors and Phillips Advantage F40AX41 fluorescent lamps, which accentuate the warm colors. Thus, the present lighting system brings the light of the service center to as near a natural light as possible, enhances the entire color spectrum giving emphasis to both the cool colors and the warm colors, causes the resulting lighting to be gentle upon the vision of the worker, enhances the surface of the car so that imperfections are made readily visible in order that they might be worked with for optimum repair and results and establishes intense lighting at hood level, preferably above 250 foot candles.

It is contemplated that the present invention may, at the option of the buyer, comprise a stereo sound system, preferably comprising an AM/FM radio and/or a compact disc, tape or cassette player. By providing a built-in sound system for the service center, music is provided for worker contentment and the temptation to workers to use the radio or stereo system of a vehicle being serviced is negated, which also eliminates any customer dissatisfaction growing out of the use of customer's vehicle stereo system by those servicing the vehicle.

Figure 22:
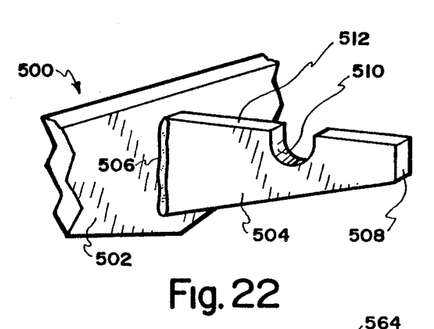
FIG. 22 is a fragmentary perspective of a bracket for holding a buffer machine during periods of nonuse.

Reference is now made to FIG. 22, which illustrates a presently preferred bracket, generally designated 500, constructed so as to be supported by the aforesaid framework at any desired location, preferably along each side of the tunnel formed by the framework and upon which hand-held buffer may be temporarily stored. The bracket 500 comprises a wedge-shaped beam 502, preferably of aluminum plate material. The beam 502 is intended to be connected at its opposed ends to column sections of the framework, using conventional fasteners or connectors. Central of the beam 502 is a perpendicularly disposed plate 500, shown as being welded or otherwise secured at site 506 to one side of the beam 502 at the central region thereof. Plate 502 is illustrated as being convergently tapered from the weld site 506 to the exposed leading edge 508. Plate 504 comprises a U-shaped recess 510 disposed along the top surface thereof, the recess 510 being sized and shaped so as to appropriately receive a hand-held buffer in such a way as to stably store the same in a readily accessible fashion during periods of nonuse.

The invention may be embodied in other specific forms without department from the spirit or essential characteristics thereof. The present embodiments, are, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. An integrated vehicle service center comprising:

three dimensional free-standing open framework means defining an unobstructed axially-accessible vehicle-receiving compartment, the framework means comprising a plurality of structurally interconnected frame means, each frame means comprising at least one column member on each side of the compartment and at least one beam member transversely bridging between the associated columns on each side of the compartment;

the framework means further comprising bearing means which rest unattached on the ground, floor or pavement and are associated with the lower end of at least some column member in load-transferring relation;

lighting means carried by the framework means comprising selectively illuminable light source means and means which directionally cause the source means to illuminate the compartment;

means where vehicle servicing products are disposed generally between column members;

means where vehicle servicing equipment is disposed during nonuse generally between the column members.

2. An integrated vehicle service center according to claim 1 wherein the framework means defining the vehicle-receiving compartment are open at both ends for one way vehicle ingress and egress.

3. An integrated vehicle service center according to claim 1 wherein the framework means defining the vehicle-receiving compartment are open at one end for two way vehicle ingress and egress.

4. An integrated vehicle service center according to claim 1 wherein each frame means are disposed in a vertical plane and comprise one column member on each side of the compartment in each vertical plane and one beam member spanning between the two column members within the same vertical plane.

5. An integrated vehicle service center according to claim 1 wherein further axially-directed beam means connected adjacent frame means and said further axially-directed beam means are transversely connected by at least one further beam member means.

6. An integrated vehicle service center according to claim 4 wherein each frame means is generally U-shaped and each column member is joined to the associated beam member by 90 degree structural corner elbow means.

7. An integrated vehicle service center according to claim 1 wherein the bearing means comprise load-transmitting bearing plate means disposed beneath each column member.

8. An integrated vehicle service center according to claim 1 wherein the lighting means comprise a plurality of distinct light sources which, taken together, provide for improved illumination of a vehicle disposed within the compartment and the surface flaws of the vehicle.

9. An integrated vehicle service center according to claim 8 wherein the plurality of distinct light sources comprise two sources of different but complimentary fluorescent lighting.

10. An integrated vehicle service center according to claim 8 wherein the plurality of distinct light sources comprise at least one source of fluorescent ligthing and at least one halogen source of lighting.

11. An integrated vehicle service center according to claim 8 wherein the plurality of distinct light sources comprise two sources of different but complementary fluorescent lighting and at least one halogen source of lighting.

12. An integrated vehicle service center according to claim 1 wherein the light source means are carried by at least some of the beam members and are downwardly directionally oriented to illuminate the top, trunk and hood of a vehicle in the compartment and other of said light source means are carried by at least some of the column members and are inwardly directionally oriented so as to illuminate the sides of a vehicle in the compartment along the sides thereof.

13. An integrated vehicle service center according to claim 1 wherein the means where vehicle servicing products are disposed and the means where vehicle servicing equipment is disposed comprise cabinetry.

14. An integrated vehicle service center according to claim 13 wherein at least some of the cabinetry is free-standing.

15. An integrated vehicle service center according to claim 13 wherein at least some of the cabinetry is carried by and transmits its load to column members.

16. An integrated vehicle service center according to claim 13 wherein at least some of the cabinetry is modular.

17. An integrated vehicle service center according to claim 1 wherein the lighting means comprise halogen light sources carried by the framework means adjacent at least some of the beam means.

18. An integrated vehicle service center according to claim 1 wherein the lighting means comprise control means by which the intensity of the light sources may be selectively adjusted.

19. An integrated vehicle service center according to claim 1 further comprising an electrical distribution system.

20. An integrated vehicle service center according to claim 19 wherein the electrical distribution system comprises a master electrical box serviced by pigtail means adapted to electrically communicate with an existing conventional source of electricity.

21. An integrated vehicle service center according to claim 19 wherein the electrical distribution system comprises wiring means routed along members of the framework to a plurality of outlet locations disposed generally adjacent to the compartment.

22. An integrated vehicle service center according to claim 19 wherein the electrical distribution system comprises at least one outlet carried by retractable reel means supported by the framework.

23. An integrated vehicle service center according to claim 1 further comprising mat rack means located generally between column members.

24. An integrated vehicle service center according to claim 23 wherein the mat rack means comprise angularly disposed matengaging platform means.

25. An integrated vehicle service center according to claim 23 wherein the platform means are pervious to air to enhance mat drying.

26. An integrated vehicle service center according to claim 23 wherein the mat rack means comprise mat-receiving platform means and means by which the platform means are angularly adjusted.

27. An integrated vehicle service center according to claim 26 further comprising means by which the platform means may be releasibly locked in any one of several angular dispositions.

28. An integrated vehicle service center according to claim 1 further comprising fan means carried by the framework means by which the surface temperature of a vehicle in the compartment and surface treatment products applied thereto are controlled.

29. An integrated vehicle service center according to claim 28 wherein the fan means are disposed at the top corners of the compartment.

30. An integrated vehicle service center according to claim 1 further comprising a self-contained water supply system and drainage means.

31. An integrated vehicle service center according to claim 30 wherein the water supply system comprises cold water supply means and hot water supply means.

32. An integrated vehicle service center according to claim 30 further comprising liquid flow means connecting hot and cold water from existing conventional sources to the hot and cold water supply means, respectively.

33. An integrated vehicle service center according to claim 30 wherein the drainage means comprising holding tank means, pump means associated with the holding tank means and liquid flow means connecting the pump to an existing conventional drain.

34. An integrated vehicle service center according to claim 30 wherein the drainage means comprise filter means.

35. An integrated vehicle service center according to claim 30 wherein sink means are interposed between the cold and hot water supply means and the drainage means.

36. An integrated vehicle service center according to claim 1 further comprising vehicle service equipment comprising at least one of air compressor means, vacuum means, surface buffing means, blower means for drying the interior of a vehicle, carpet cleaning means and sound system means.

37. An integrated vehicle service center according to claim 1 further comprising surface buffer means and bracket means carried by the framework means for accessibly storing the surface buffer means during non-use.

38. An integrated vehicle service center according to claim 1 further comprising compressor means comprising a plurality of outlets at least one of which is carried by retractable reel means.

39. An integrated vehicle service center according to claim 1 wherein the framework means are at least partly covered.

40. An integrated vehicle service center comprising: three dimensional free-standing open framework means defining an unobstructed axially-accessible vehicle-receiving compartment, the framework means comprising a plurality of structurally interconnected frame means, each frame means comprising at least one column member on each side of the compartment and at least one beam member transversely bridging between the associated columns on each side;
the framework means further comprising bearing means which rest unattached on the ground, floor or pavement and are associated with the lower end of at least some of the column members in load-transferring relation;
lighting means carried by the framework means comprising selectively illuminable light source means and means which directionally cause the source means to illuminate the compartment.

41. A method of assembling a vehicle service center comprising the steps of:
placing bearing structure in unattached contiguous load-transferring relation with a ground, floor or pavement surface;
erecting upon the bearing structure an open framework comprising interconnected structural members comprising columns and beams which together define a vehicle-receiving compartment;
installing an array of directional light sources generally at the sides and top of the compartment for illumination of the compartment.

42. A method of assembling a vehicle service center comprising the steps of:
placing bearing structure in unattached contiguous load-transferring relation with a ground, floor or pavement surface;
erecting upon the bearing structure an open framework comprising interconnected structural members comprising columns and beams which together define a vehicle-receiving compartment;
installing an array of directional light sources generally at the sides and top of the compartment for illumination of the compartment;
disposing vehicle servicing products and equipment at selected locations generally along the side perimeter of the compartment.

43. A method according to claim 42 further comprising the step of supplying water to at least one location generally between columns.

44. A method according to claim 43 further comprising the step of draining used water from the service center.

45. A method according to claim 42 further comprising the step of distributing electricity to outlets carried by the framework generally at the periphery of the compartment.

46. A method according to claim 42 further comprising the step of disposing a floor mat cleaning rack between columns generally at the periphery of the compartment.

47. A method according to claim 42 further comprising the step of locating at least one fan generally at an elevated location along the periphery of the compartment.

* * * * *